United States Patent
Voth

(10) Patent No.: US 8,998,603 B2
(45) Date of Patent: Apr. 7, 2015

(54) CONTAINER TREATMENT DEVICE WITH STRETCHING DEVICE

(71) Applicant: Krones AG, Neutraubling (DE)

(72) Inventor: Klaus Voth, Obertraubling (DE)

(73) Assignee: Krones AG (DE)

( * ) Notice: Subject to any disclaimer, the term of this patent is extended or adjusted under 35 U.S.C. 154(b) by 0 days.

(21) Appl. No.: 14/086,645

(22) Filed: Nov. 21, 2013

(65) Prior Publication Data

US 2014/0147545 A1 May 29, 2014

(30) Foreign Application Priority Data

Nov. 23, 2012 (DE) .................... 10 2012 111 363

(51) Int. Cl.
*B29C 49/12* (2006.01)
*B29C 49/06* (2006.01)

(52) U.S. Cl.
CPC .......... *B29C 49/12* (2013.01); *B29C 2049/1204* (2013.01); *B29C 2049/129* (2013.01); *B29C 49/06* (2013.01)

(58) Field of Classification Search
CPC ........................ B29C 49/12; B29C 2049/1204
USPC .................................................. 425/182, 529
See application file for complete search history.

(56) References Cited

U.S. PATENT DOCUMENTS

| | | | |
|---|---|---|---|
| 5,178,817 A * | 1/1993 | Yamada et al. .............. | 425/529 |
| 5,269,672 A | 12/1993 | DiGangi, Jr. | |
| 2007/0108157 A1 | 5/2007 | Dupuis et al. ................. | 215/379 |
| 2010/0078861 A1 | 4/2010 | Herklotz et al. .............. | 264/532 |
| 2010/0159056 A1 | 6/2010 | Toutoux et al. ............... | 425/150 |
| 2011/0241265 A1* | 10/2011 | Schmidt ........................ | 425/529 |
| 2011/0262576 A1 | 10/2011 | Weiss ............................ | 425/181 |
| 2011/0287126 A1* | 11/2011 | Geltinger et al. ............. | 425/522 |
| 2012/0139169 A1 | 6/2012 | Finger .......................... | 264/532 |

FOREIGN PATENT DOCUMENTS

| | | | | |
|---|---|---|---|---|
| DE | 10 2011 012 664 | 8/2012 | ............. | B65B 3/02 |
| EP | 0 577 384 | 1/1994 | ............. | B29C 49/12 |
| EP | 2 186 619 | 5/2010 | ............. | B29C 49/12 |
| EP | 2 383 100 | 11/2011 | ............. | B29C 49/12 |
| EP | 2 460 638 | 6/2012 | ............. | B29C 49/12 |
| FR | 2 863 929 | 6/2005 | ............. | B29C 49/12 |
| WO | WO 2008/098565 | 8/2008 | ............. | B29C 49/42 |

OTHER PUBLICATIONS

European Search Report issue in corresponding European Patent Appln. No. 13194239.9-1706 dated Mar. 17, 2014 (5 pgs).

* cited by examiner

*Primary Examiner* — Robert B Davis
(74) *Attorney, Agent, or Firm* — Hayes Soloway P.C.

(57) ABSTRACT

Described is a container treatment device for the expansion of pre-forms into containers, having at least one blow moulding device for the introduction of a flowable medium under pressure into an inner space of the pre-form, and at least one stretching device for stretching the pre-form during an expansion procedure. The blow molding device has at least one blow molding nozzle piston and the stretching device has at least one stretch rod which is movable at least locally and at least for a time through a through opening of the blow molding nozzle piston in a translational manner and which is operatively connected to at least one portion of a stretch rod drive device, wherein at least one bearing element is arranged in the region of the through opening in order to guide the stretch rod.

13 Claims, 2 Drawing Sheets

CONTAINER TREATMENT DEVICE WITH STRETCHING DEVICE

BACKGROUND OF THE INVENTION

The present invention relates to a container treatment device for expanding pre-forms into containers, having at least one blow moulding device for introducing a flowable medium under pressure into an inner space of the pre-form, and at least one stretching device for stretching the pre-form during an expansion procedure.

The container treatment device according to the invention, which also has a stretching device in addition to a blow moulding device, is consequently preferably a stretch/blow moulding device for stretch blow moulding or expanding respectively a pre-form and, in particular, a plastics material pre-form, into a container and, in particular, a plastics material container, such as for example a beverage bottle.

A stretch/blow moulding device with a stretching device and a blow moulding device is known for example from WO2008098565, this stretch/blow moulding device having a plurality of components or elements respectively, such as for example inter alia a threaded rod and a stretch rod carrier connected to it by way of a coupling element for moving the stretch rod into a pre-form to be expanded or out of an expanded container respectively, or a coupling arranged between a shaft of a motor and the threaded rod, in order to ensure not only a blow moulding process but, in addition, also a stretching process for expanding a pre-form. It is clearly evident from the stretch/blow moulding device of WO2008098565 that an independent or additional linear guide of the stretch rod is always necessary, in which case covering elements have to be additionally introduced in order to prevent contamination of the stretch rod by the threaded rod for example. In addition, the complex design of the stretch/blow moulding device of WO2008098565 prevents the stretch rod from being able to be replaced in a simple and rapid and therefore inexpensive manner in case of need. In fact, the stretch rod is arranged between individual devices, such as for example the pneumatic valve or the stretch rod carrier respectively and the pneumatic block, in such a way that a time consuming dismantling of a plurality of structural elements is necessary in order to make a replacement of the stretch rod possible.

A comparable complex design of a stretch/blow moulding device is also displayed for example by EP 0 577 384 A1, which discloses an arrangement of a stretch rod over a carrier guided in a linear manner, this carrier in turn being operatively connected to a threaded rod coupled to a motor shaft, in such a way that the carrier is moved up and down in a translational manner by the rotational movement of the threaded rod. In this case too there is again a need for an additional linear guidance of the stretch rod, namely the carrier interacting with the threaded rod, as a result of which the stretch/blow moulding device of EP 0 577 384 A1 not only is also costly and maintenance intensive, but also does not allow a rapid and simple change of the stretch rod.

Accordingly, the object of the present invention is to make available a container treatment device, and in particular, a stretch/blow moulding device for expanding pre-forms into containers, which, in particular with respect to the devices named above, has a form designed in a structurally simple manner and with a small number of structural elements, in order to reduce the production costs, assembly costs and maintenance costs of the device, and in which the device itself is to be designed in such a way that a simple replacement of the stretch rod is made possible, and in which, in particular, the occurrence of components which contaminate the stretch rod is to be reduced, in order to prevent contamination, such as oil, grease and so on, which is capable of reaching the stretch rod and thus the container which is to be expanded.

SUMMARY OF THE INVENTION

The container treatment device according to the invention for expanding pre-forms into containers has at least one blow moulding device for introducing a flowable medium under pressure into an inner space of the pre-form, and at least one stretching device for stretching the pre-form during an expansion procedure.

In addition, the blow moulding device of the container treatment device according to the invention has at least one blow moulding nozzle piston or one blow moulding nozzle device respectively and the stretching device has at least one stretch rod which is movable at least in sections and at least for a time through a through opening of the blow moulding nozzle piston in a translational manner and which is operatively connected to at least one portion of a stretch rod drive device, at least one stretch rod bearing element being arranged (only) in the region of the through opening in order to guide the stretch rod.

It is preferable for the blow moulding nozzle device also to be provided for guiding the stretch rod or the movement thereof respectively, and it is particularly preferred for no further guiding device in addition to this guiding device to be provided for guiding the stretch rod. In other words, the blow moulding nozzle device is the only device which is used for guiding the movement of the stretch rod.

Consequently the stretch rod is preferably directly connected to a portion or region respectively of the stretch rod drive device, for example by way of a connection with positive locking, such as a bayonet closure or a screw-type closure, or even in a friction or non-positively locking manner, in the form of a press fitting.

According to a preferred embodiment the stretch rod drive device is a motor capable of being driven electrically, in particular a linear motor and in particular a tubular linear motor, which preferably also has, in addition to a rotor, a stator which preferably surrounds the rotor and is advantageously stationary. In addition, this motor contributes to making it possible for the guiding stresses to be kept low. In this way, it would be possible for the guidance of the movement of the combination of the stretch rod and the rotor of the linear motor to be carried out as a whole only by the tubular or pipe-shaped stator on the one hand and by the blow moulding nozzle device on the other hand.

The tubular linear motors which are known from the general prior art and which can also be used in the container treatment device according to the invention have magnets, such as for example neodymium magnets, which are arranged in a preferably non-magnetic steel tube. The individual magnets, which can be designed in the form of plate-shaped or annular magnets, are preferably inserted with opposite poles into this (precision) steel tube so that a north-south-north-south field arrangement is formed on the outside of the steel tube. The stator preferably has an iron tube which acts as a back iron for the magnetic flux. The windings, which are preferably designed in the form of two- or three-phase windings and are positioned on a winding support which at the same time has the function of a sliding bearing, are arranged inside this iron tube.

The rotor, which moves in a translational manner—preferably inside the stator—and which moves at least within defined movement limits through a corresponding bore in the stator, preferably has a coupling region which corresponds in particular to an end face of the rotor, by means of which a connection is made possible between the rotor and the stretch rod. The rotor, which in particular is rod-shaped, preferably has a circular cross-section, it also being possible, however, for the cross-section to be oval, triangular, quadrangular or polygonal. The movement of the rotor is preferably guided in the stator.

In this way, it is possible for the stretch rod to have a circular cross-section, in which case the cross-section of the stretch rod is preferably designed to correspond to the shape of the cross-section of the rotor, so as advantageously to allow a direct arrangement of the rotor on the stretch rod.

In an embodiment in which the (rod) diameter of the rotor is made larger than the diameter of the stretch rod, it would consequently be possible for the rotor to be provided at least in sections at the end thereof which is connected to the stretch rod (connection end) with an internal thread into which engages the stretch rod which has an external thread at least in sections at the end thereof which is connected to the rotor (connection end). In addition, a press fitting would be possible, so that the connection end of the stretch rod is pressed into a recess in the connection end of the rotor. In addition, adhesive, welding, plug-in connections and so forth are possible. It is preferable, however, for those types of connection to be selected which can be released again in a manner free from damage in order to allow in particular a simple and rapid replacement of the stretch rod.

It is preferable for the stretch rod likewise to be moved—by a substantially translational movement of the rotor along a longitudinal axis of the rotor, for example in the direction of the pre-form to be expanded or the other way round—along a longitudinal axis in the direction of the pre-form to be expanded and into an inner region of the pre-form or out of the latter.

As a result, it is preferable for only one through opening of the blow moulding nozzle piston, which in particular can likewise be moved in the direction of the container to be expanded—or in a direction opposite to it—in a translational manner, to serve as a linear guide of the stretch rod.

In particular, in order to reduce friction during the movement of the stretch rod through the through opening of the blow moulding nozzle piston and/or to ensure a defined guidance or movement respectively of the stretch rod, it is preferable for at least one stretch rod bearing element or stretch rod guide element respectively to be arranged inside the through opening, the aforesaid element being for example a linear guide, such as a sliding guide or a roller guide. It is preferable for the through opening to have a stretch rod guide bush, in which case the resistance caused by sliding friction is reduced by the selection of a low-friction pairing of materials.

It is preferable for the stretch rod to have a bore which extends through the stretch rod in the longitudinal direction and through which for example a flowable medium, such as for example air for expanding the pre-form to form a container, or even a sterilization medium, such as a sterilization gas, or a cooling medium etc., can flow or run respectively.

In a further preferred embodiment the container treatment device according to the invention has a coupling device which, in particular, is preferably arranged between the stretch rod and the stretch rod drive device and, in particular, between the stretch rod and the rotor of the stretch rod drive device or the rotor of the linear motor or the motor respectively. It is also possible, however, for the container treatment device to be produced without this coupling device.

As a result, according to a preferred embodiment a connection between the rotor and the stretch rod is made, in particular, in an indirect manner by way of the coupling device.

It is preferable for the coupling device to have at least one rotor coupling element and one stretch rod coupling element, in which case the rotor coupling element has at least one first force absorption side and at least one first force delivery side and the stretch rod coupling element has at least one first force absorption side and at least one first force delivery side.

In this way, the first rotor coupling element force absorption side and the first stretch rod coupling element force absorption side respectively extend in a plane which extends substantially parallel to a plane in which the first rotor coupling element force delivery side and the first stretch rod coupling element force delivery side respectively extend. The two sides, namely the first rotor coupling element force absorption side and the first rotor coupling element force delivery side or the first stretch rod coupling element force absorption side and the first stretch rod coupling element force delivery side respectively, extend in this case along planes which extend substantially congruently with each other and also substantially at a uniform distance from each other. As a result, a trouble free transmission of force from the rotor to the stretch rod is made possible.

In this case a force absorption side of a coupling element is defined as being that side on which a thrust force for example first acts, in particular during the expansion procedure or expanding, i.e. when the stretch rod is moved in the direction of the container to be expanded and, in particular, into the latter, or a tensile force first acts, in particular after the expansion procedure or expanding, i.e. during the release procedure, when the stretch rod is moved out of the expanded container away from the latter in the direction of a starting position, respectively.

Accordingly, each coupling element of the coupling device has, in particular, at least one force absorption side and one force delivery side in each case.

It is preferable for the rotor to be arranged on the first rotor coupling element force absorption side and for the stretch rod to be arranged on the first stretch rod coupling element force delivery side.

This means that, during the expansion procedure, as a result of a translational movement of the rotor a thrust force is applied in the direction of the container to be expanded to the at least one first force absorption side of the rotor coupling element, in which case the force flows from there through the rotor coupling element in the direction of the first rotor coupling element force delivery side, and from the first rotor coupling element force delivery side to the first stretch rod coupling element force absorption side. The thrust force flows from the first stretch rod coupling element force absorption side further in the direction of the first stretch rod coupling element force delivery side and from there to the stretch rod which in particular is directly connected to the first force delivery side of the stretch rod coupling element. As a result, on account of the thrust force transmitted by the rotor the stretch rod is moved into the container to be expanded.

Corresponding remarks apply, in particular, to the case of the tensile force acting upon the rotor, for example during a release procedure in which the stretch rod is moved out of the expanded container again after the expansion procedure. In this case a tensile force is preferably applied by way of the rotor to the first force absorption side of the rotor coupling element and from there through the rotor coupling element in the direction of the first rotor coupling element force delivery side and after that to the first stretch rod coupling element force absorption side, from where the tensile force flows in the direction of the first stretch rod coupling element force delivery side, in order to be absorbed by the stretch rod, which as a result is consequently caused to make a translational movement out of the expanded container. In this case it is necessary, however, for at least one connection (with positive locking) of such a type to be present in particular between the first rotor coupling element force delivery side and the first stretch rod coupling element force absorption side that even tensile forces can be transmitted without additional holding elements. To this end it would be possible for the first rotor coupling element force delivery side or the first stretch rod coupling element force absorption side to have engagement elements which engage in the adjacent side, namely the first stretch rod coupling element force absorption side or the first rotor coupling element force delivery side or in corresponding shaped-out portions respectively.

It is additionally possible for at least one portion and, in particular, one end portion of the stretch rod to be inserted in a bore of the stretch rod coupling element and/or for at least one portion and, in particular, one end portion of the rotor to be inserted in a bore of the rotor coupling element, in order to permit a rigid or fixed connection between the corresponding coupling elements and the rotor or the stretch rod respectively. The connection between the coupling elements and the rotor or the stretch rod respectively can be made in this case with positive locking or with friction locking, in which case suitable connecting elements, such as for example in the form of a bayonet closure, can be present in the case of a connection with positive locking.

In addition, it would be possible for the bore inside the coupling elements to have internal threads, whilst the rotor or the stretch rod respectively had external threads at least in sections which could engage in the corresponding internal threads.

On account of such an arrangement or connection respectively of the stretch rod or the rotor respectively to the corresponding coupling elements, a simple replacement of the individual components is advantageously made possible.

In a further preferred embodiment the rotor coupling element is arranged at least in sections in a recess of the stretch rod coupling element, the recess being made larger at least locally or region by region and, in particular, at least one region of the recess being made larger at least in a peripheral direction which extends at a right angle to the direction of movement of the stretch rod than a periphery of the rotor coupling element which extends at a right angle to the direction of movement of the stretch rod, in order to allow at least a limited movement of the rotor coupling element in the direction which extends at a right angle to the direction of movement of the stretch rod (first embodiment of the coupling device).

It would also be possible, however, for the stretch rod coupling element to be arranged at least in sections in a recess of the rotor coupling element, the recess being made larger at least locally or region by region and, in particular, at least one region of the recess being made larger at least in a peripheral direction which extends at a right angle to the direction of movement of the stretch rod than a periphery of the stretch rod coupling element which extends at a right angle to the direction of movement of the stretch rod, in order to allow at least a limited movement of the stretch rod coupling element in the direction which extends at a right angle to the direction of movement of the stretch rod (second embodiment of the coupling device). It is preferable, however, for the coupling device not to have clearance in the longitudinal direction or the direction of movement respectively of the stretch rod. It is preferable for this direction of movement also to be a longitudinal direction of the containers to be expanded.

In the two embodiments the coupling elements are designed in such a way that they can engage in each other or can be inserted into each other respectively at least in part.

In order to allow, in particular, a movement of the coupling elements towards each other in the aforesaid peripheral direction—direction at a right angle to the direction of movement of the stretch rod—but at the same time to prevent a movement of the of the coupling elements towards each other in a direction substantially along or parallel to the direction of movement of the stretch rod—without a connection being necessary between the first rotor coupling element force delivery side and the first stretch rod coupling element force absorption side—the recess of the corresponding coupling element, i.e. the rotor coupling element or the stretch rod coupling element, has two designed regions different from each other.

Accordingly, the recess of one coupling element has a second region which, in particular, can receive the other or second coupling element, whilst the first region is made smaller in such a way that only at least a region of the rotor or the stretch rod can pass through it, whilst the second coupling element inserted into the recess cannot pass through this first region of the recess. Accordingly, in particular, a sort of retention element or holding element respectively, which preferably extends at least in part or at least in sections respectively along the first rotor coupling element force absorption side (first embodiment) or along the first stretch rod coupling element force delivery side (second embodiment), is formed by the first region of the recess. With the aid of this holding element a slippage or even a release of the individual coupling elements—in particular in the direction of the direction of movement of the stretch rod—is prevented primarily during a return of the stretch rod from the expanded container in the direction of the starting position.

In addition, at least one second force absorption side, namely a second stretch rod coupling element force absorption side (first embodiment) or one second force delivery side, namely a second rotor coupling element force delivery side (second embodiment), is formed by this holding element.

The second stretch rod coupling element force absorption side preferably extends in this case in a plane parallel to the first rotor coupling force absorption side and touches the latter at least in sections and at least for a time.

The second rotor coupling element force delivery side preferably extends in this case in a plane parallel to the first stretch rod coupling element force delivery side and touches the latter at least in sections and at least for a time.

In the two embodiments the first region of the recess preferably has a smaller periphery in the vertical direction of the direction of movement of the stretch rod than the second region of the recess, which essentially receives the other, second coupling element, the two regions of the recess preferably having a common central middle axis. The entire recess thus extends, starting from a surface of the corresponding coupling element, into the interior, in which case the first region of the recess extends from the surface of the coupling element to the second region of the recess, which is formed essentially in the interior of the coupling element.

Consequently the first region of the recess merges into the second region of the recess, in which case the common central middle axis or longitudinal axis respectively of the regions of the recess is in alignment with a central longitudinal axis of the rotor and/or the stretch rod, the respective central longitudinal axes extending in the direction of the direction of movement of the stretch rod.

It is preferable—in particular in the case of the first and second embodiments of the coupling device—for at least one region of the first rotor coupling element force delivery side to contact at least in sections a region of the first stretch rod coupling element force absorption side, in order to transmit the force (thrust force) exerted by the rotor upon the coupling element to the stretch rod at least during the expansion procedure in a positively locking and/or friction locking manner, as a result of which the stretch rod is caused to move in the direction of the pre-form or container respectively which is to be expanded.

In particular—present in the case of the first embodiment of the coupling device—at least one region of the first rotor coupling element force absorption side consequently contacts—preferably during the release procedure, i.e. after the expansion procedure—at least in sections a side of the region of the stretch rod coupling element—namely the second stretch rod coupling element force absorption side—which rests in the form of a holding element—formed on account of the different dimensions of the first and second regions of the recess—against the first rotor coupling element force absorption side in order to transmit the force (tensile force) exerted by the rotor upon the coupling element to the stretch rod in a positively locking and/or friction locking manner.

Accordingly, in particular present in the case of the second embodiment of the coupling device, the stretch rod coupling element force delivery side contacts—preferably during the release procedure, i.e. after the expansion procedure—at least in sections a side of the region of the rotor coupling element—namely the second rotor coupling element force delivery side—which rests in the form of a holding element—formed on account of the different dimensions of the first and second regions of the recess—against the first stretch rod coupling element force delivery side (which in this case operates more as a force absorption side) in order to transmit the force (tensile force) exerted by the rotor upon the coupling element to the stretch rod in a positively locking and/or friction locking manner.

It is also possible, however, for the coupling device to be designed in particular in the form of a bayonet connection or a bayonet closure respectively, in which case either the rotor coupling element has corresponding recesses or guides or slots respectively into which projections of the other coupling element, such as the stretch rod coupling element, engage to this end or the other way round. In this embodiment it would be possible to dispense with recesses of the type named above.

A simple and rapid replacement of the stretch rod is possible in an advantageous manner by a suitable design of the coupling device by means of two coupling elements.

As already mentioned, the rotor preferably has a central longitudinal axis which extends at least in sections in the direction of movement of the stretch rod and which is preferably in alignment at least in sections and at least for a time with a central longitudinal axis of the stretch rod extending at least in sections in the direction of movement of the stretch rod.

As a result, a gearless connection between the rotor and the stretch rod is advantageously made possible inter alia.

In a further preferred embodiment the container treatment device has a holding apparatus which extends at least in sections in the direction of the direction of movement of the stretch rod and on which a valve block device guiding and surrounding at least in sections the blow moulding nozzle piston and/or a cooling device surrounding at least in part the stretch rod drive device is or are arranged in a stationary manner. It is advantageous for the stator of the drive of the stretch rod to be mounted in a cooling jacket.

Accordingly, it is preferable for only the valve block device and/or the cooling device to be mounted on the holding apparatus. The holding apparatus does not comprise a mounting of a linear guide for the stretch rod, in particular since the stretch rod itself is guided or mounted respectively by way of stretch rod bearing devices or stretch rod bearing elements respectively arranged inside a through opening of the blow moulding nozzle piston.

In order to position and, in particular, to centre the valve block device and the cooling device respectively on the holding device it is possible for the holding device to have at least one groove which preferably extends substantially at least in sections in the direction of the direction of movement of the stretch rod and into which corresponding recesses of the valve block device or even the stator of the motor itself and/or of the cooling device engage. As a result, it can be made possible inter alfa for the corresponding through openings or bores respectively of the individual elements to be mounted congruently and centred with respect to one another, in such a way that a translational movement of the rotor and the stretch rod itself is made possible in a trouble free manner in the direction of the container to be expanded.

It is preferable for the stator to be arranged in a rigid manner inside the cooling device, in which case the cooling device is used, in particular, for the cooling of the motor during the operation thereof, in order to prevent overheating and thus wear or even breakdown of the motor.

Guiding devices or mounting devices respectively of the rotor are arranged primarily in the stator and, in particular, in the bore of the stator.

It is preferable for the container treatment device according to the invention to have a covering device which is arranged in particular at least in sections between the valve block device and the stator, in order to surround substantially the entire periphery of the component portions of the stretch rod, the rotor and/or the coupling device situated between them, as a result of which it is possible to prevent contamination which arrives from the outside on the rotor or the stretch rod respectively from being able to penetrate into the stator and the bore of the stator and thus into the gap between the stator and the rotor as a result of the movement of the rotor. Contamination of this type in the gap of the motor can lead to a negative impairment of the motor output and thus for example to an increase in the production costs.

In addition, it would be possible for the covering device to seal off the movement space of the rotor and the stretch rod and/or the coupling device between the stator and the valve block device or the blow moulding nozzle piston respectively in such a way that a cleaning medium could also be introduced inside this movement space, as a result of which any contamination could be rinsed out from the stator and, in particular, the stator gap.

As an alternative or in addition, it would also be possible for the entire container treatment device to be arranged inside a clean room which to this end could be cleaned or sterilized in a suitable manner with a cleaning medium or a sterilization gas respectively, in order to prevent soiling and/or contamination of the devices and/or of the container to be expanded.

In a further preferred embodiment a plurality of the container treatment devices according to the invention are preferably arranged at a uniform distance from one another on a common carrier, such as a blow moulding wheel or a conveying wheel respectively or a suitable conveying device, which can also correspond substantially to a conveyor belt.

In particular, the carrier or also a carrier extending in a parallel plane towards it has a pre-set number of blow moulding stations which in particular have two blow mould parts in each case which can be opened or closed respectively and, in particular, can be locked with each other. Consequently, it is preferable for precisely one blow mould to be associated with each container treatment device according to the invention.

It is preferable for the container treatment device according to the invention to be arranged at least in sections and/or for a time inside a clean room which is delimited from an outer room or an environment respectively in such a way that substantially sterile conditions can be maintained in the clean room in order to allow a contamination free zone at least during the handling of the containers.

The container treatment device according to the invention is preferably a component of a container treatment plant which can have a plurality of container treatment devices acting in different ways for widely differing treatment of containers, such as heating, sterilization, labelling, filling, closing etc. This container treatment plant advantageously also comprises inter alia conveying devices, such as for example conveying wheels, carrier elements, star wheels or the like for the conveying or carrying respectively of the individual container treatment devices as well as conveying devices, such as conveying wheels and/or conveyor belts and/or conveying rails or the like for holding the pre-forms to be expanded just like the already expanded containers in defined positions for the treatment of these pre-forms or containers respectively, and for the simultaneous conveying of these pre-forms or containers respectively from an entry point into the container treatment plant to a first container treatment device, from there to a further device etc., and finally to an outlet point, in order to be able to remove the treated containers from the treatment plant again.

Further advantages, aims and properties of the present invention are explained with reference to the following description and the accompanying drawings, in which an embodiment of the container treatment device according to the invention with a blow moulding device and a stretching device as well as a coupling device is illustrated by way of example.

BRIEF DESCRIPTION OF THE DRAWING

Components which correspond at least substantially with respect to their function in the figures can be designated in this case with the same references, it not being necessary for these components to be designated and explained in all the figures.

In the drawings

DETAILED DESCRIPTION OF THE INVENTION

Figure 1:
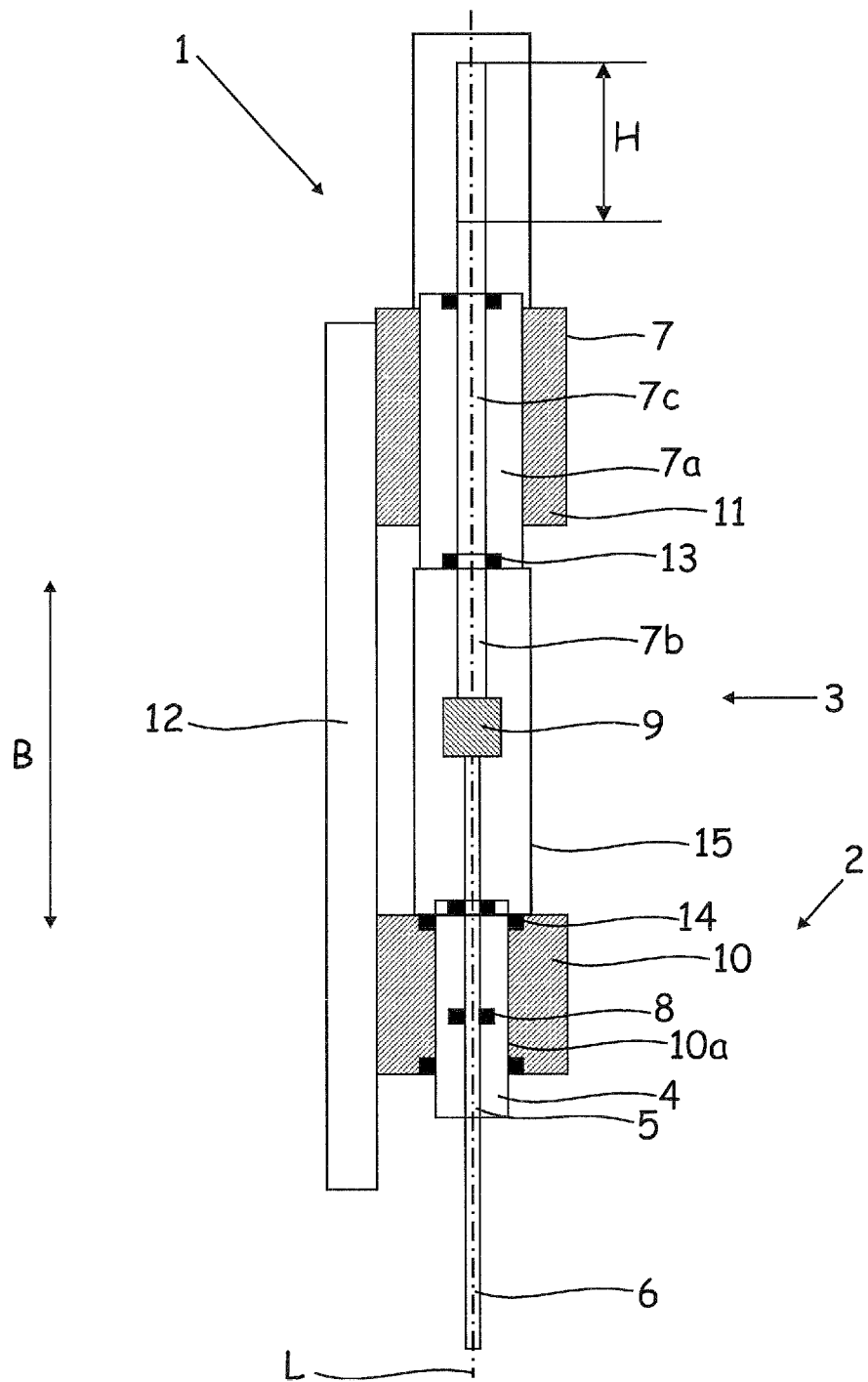
FIG. 1 is a diagrammatic drawing of a longitudinal section (in the direction of movement) through a first embodiment of a container treatment device according to the invention.

FIG. 1 is a diagrammatic drawing of a longitudinal section (in the direction of movement B) through a first embodiment of a container treatment device 1 according to the invention, which has a blow moulding device 10 and a stretching device 3. The blow moulding device 2 has, in particular, a valve block device 10 and a blow moulding nozzle piston 4 which is surrounded at least in sections in the peripheral direction thereof—which extends at a right angle to the direction of movement B of the stretch rod 6 or the rotor 7b respectively—by the valve block device 10. This blow moulding nozzle piston is capable of being placed on an aperture of the container or the carrying ring thereof in order to be able to act upon the latter with compressed air in this way.

The valve block device 10 is preferably connected in a rigid manner to a holding apparatus 12 and in particular to the holding apparatus 12 in a lower region thereof. The holding apparatus 12 likewise extends at least in sections along a direction of movement B.

The valve block device 10 has a bore 10a which extends through the valve block device 10 substantially parallel to the direction of movement B, in order to be able to receive therein the blow moulding nozzle piston 4 which likewise extends at least in sections through this valve block device bore 10a in the direction of movement B and which also moves through at least for a time. The blow moulding nozzle piston 4 is mounted inside this valve block device bore 10a by means of corresponding blow moulding nozzle piston bearing elements 14 which can be designed in particular in the form of guide bushes. Sliding bearings or even roller bearings would also be possible in order to mount the blow moulding nozzle piston 4, however, so that the mounting of the blow moulding nozzle piston 4 should not be restricted to a specific bearing element 14.

To this end, the blow moulding nozzle piston 4 has even a through opening 5 or a through bore 5 respectively which extends in a corresponding manner in the direction of the direction of movement B.

The direction of movement B is defined by the translational movement of the stretch rod 6 and of the rotor 7b of the stretch rod drive device 7 which is described in still greater detail below. Accordingly, the direction of movement B corresponds to the direction of movement in particular of the stretch rod 6 towards the container to be expanded or away from the expanded container respectively, so that in accordance with the view of FIG. 1 the direction of movement B corresponds substantially to a perpendicular or vertical movement or direction of movement respectively. This direction of movement changes, however, in a manner corresponding to the arrangement of the container to be treated with respect to the container treatment plant and—in a corresponding manner—to the orientation of the container treatment plant with respect to the container to be treated. In the present FIG. 1 the container to be treated (not shown here) is moved from below to the container treatment device 1, so that consequently the stretch rod 6 performs a translational movement directed substantially vertically downwards from above during the expansion procedure/expanding and upwards from below during the release procedure. This direction of movement preferably also corresponds in this case to a longitudinal direction of the container to be expanded.

The stretch rod 6, which is guided or mounted respectively by means of suitable stretch rod mounting elements 8 inside the through opening 5 and according to the invention exclusively by way of these stretch rod mounting elements 8, is guided through the through opening 5 of the blow moulding nozzle piston 4. The stretch rod mounting elements 8 for mounting the stretch rod 6 can also be for example guiding bushes or sliding bushes respectively or corresponding sliding elements or even roller bearings.

In the embodiment of the container treatment device 1 shown in FIG. 1 the through opening 5 has precisely two stretch rod mounting elements 8, in which case one stretch rod mounting element 8 is arranged directly in the entry region of the through opening 5, whereas the second stretch rod mounting element 8 is arranged substantially centrally, i.e. halfway through the through opening 5, in the through opening 5, in order to allow an adequate guidance or mounting respectively and as wear free as possible a sliding of the stretch rod 6 through the through opening 5.

The stretch rod 6 is connected to a coupling device 9 which in turn is connected to a rotor 7b of a stretch rod drive device 7 which in particular is a tubular linear motor. In this way, the stretch rod 6 is consequently (indirectly) operatively connected to the rotor 7b by way of the coupling device 9.

During the expansion procedure or during the release procedure respectively the rotor 7b moves through a (stator) bore 7c of a stator 7a which is likewise a component of the stretch rod drive device 7. The stator bore 7c likewise extends in this case substantially in the direction of the direction of movement B.

It is preferable for the stator bore 7c or the stator 7a or the rotor 7b respectively, the stretch rod 6, the through opening 5, the blow moulding nozzle piston 4 and/or the valve block device bore 10a or the valve block device 10 respectively to have in each case—at least for a time—a common central longitudinal axis L which likewise extends in the direction of the direction of movement B. This means that the individual central longitudinal axes of the individual devices, 7, 7a, 7b, 6, 10, 4 or bores 7c, 10a, 5 respectively are in alignment with one another at least for a time. In particular, the longitudinal axes of the stretch rod 6 and the stator 7a or, in particular, the rotor 7b respectively are in alignment.

The rotor 7b is mounted inside the stator bore 7c by way of corresponding rotor bearing elements 13, in particular in such a way that a uniform gap (not shown here) is formed between the outer wall of the rotor 7b and the wall of the stator bore 7c.

The stator 7a itself is surrounded at least in sections by a cooling device 11 in order to be subjected to an adequate cooling during the operation of the stretch rod drive device 7.

The cooling device 11 is connected in a rigid manner to the holding apparatus 12 and, in particular, to an upper region of the holding apparatus 12 in a manner corresponding to the valve block device 10, so that a trouble free translational movement at least of the rotor 7b, the stretch rod 6 and also the blow moulding nozzle piston 4 can be made possible.

Furthermore, in accordance with the embodiment illustrated in FIG. 1, a covering 15 or a covering device 15 respectively is shown, which extends between the stator 7a and the valve block device 10 and preferably surrounds the entire periphery of the stretch rod 6, the coupling device 9 and the rotor 7b, which are arranged so as to be movable at least for a time between the stator 7a and the valve block device 10. As a result, a separation takes place between an outer space A and the inner space I in which at least portions of the stretch rod 6 and the rotor 7b as well as the coupling device 9 are present. As a result, contamination present for example in the outer space A cannot penetrate into the inner space I or contamination present in the inner space I cannot penetrate into the outer space A respectively.

The reference letter H represents the stroke of the stretch rod 6, i.e. the path which the stretch rod 6 and consequently also the rotor 7b and likewise the coupling device 9 arranged between the rotor 7b and the stretch rod cover during an expansion procedure from the starting position into an end of processing position or during the release procedure from the end of processing position into a starting position respectively.

Figure 2:
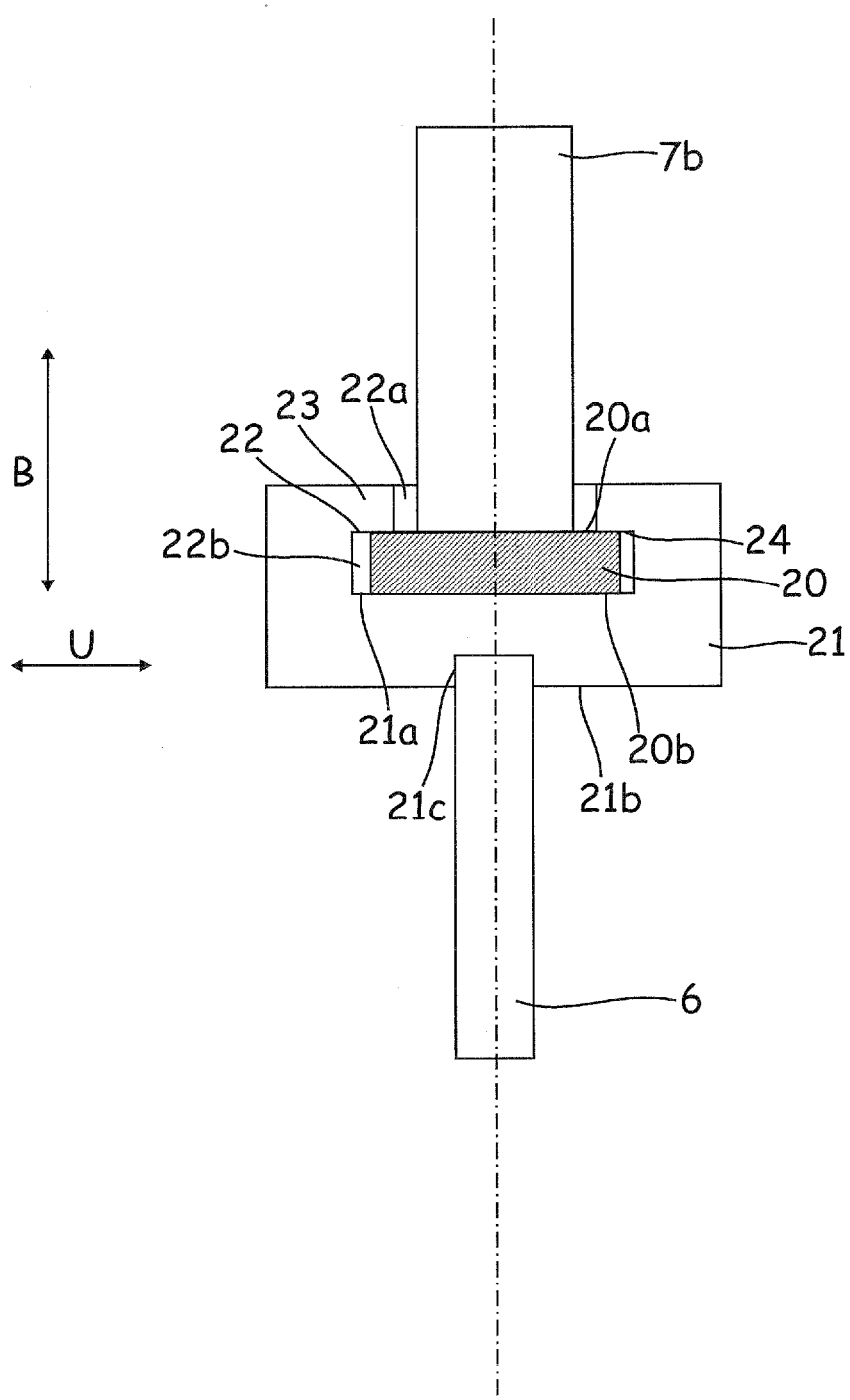
FIG. 2 is a diagrammatic drawing of a longitudinal section (in the direction of movement) of a cut-away section of an embodiment of a container treatment device according to the invention, which shows an embodiment of a coupling device.

A diagrammatic drawing of a longitudinal section through a portion of an embodiment of a container treatment device 1 according to the invention, and in particular a (first) embodiment of a coupling device 9, is reproduced in FIG. 2.

The coupling device 9 has a rotor coupling element 20 on which is arranged the rotor 7b of the stretch rod drive device 7 (cf. FIG. 1) and a stretch rod coupling element 21 on which is arranged the stretch rod 6 of the stretching device 3 (cf. FIG. 1).

The stretch rod coupling element 21 has a recess 22 which is formed from a first region 22a and a second region 22b, in which case the first region 22a of the recess 22 is made significantly smaller—in particular in the peripheral direction U extending at a right angle to the direction of movement B—than the second region 22b of the recess 22. In the sectional illustration reproduced in FIG. 2 it becomes clear that the recess has a T-shaped design as viewed in the longitudinal section. The rotor coupling element 20 can in this case have for example a circular cross-section, and likewise the recess 22. It would also be possible, however, for other cross-sections to be provided, in particular in order to be able to assemble the rotor and the stretch rod to each other and to dismantle them. In this way, it would be possible for grooves to be provided at the edge of the rotor coupling element and grooves in the recess 22, in which case assembly or dismantling is possible only in a specified rotational setting of the rotor coupling element with respect to the recess.

The rotor coupling element 20 is, in particular, arranged only inside the second region 22b of the recess 22, so that at least one region of the rotor 7b extends at least in sections through the first region 22a of the recess.

The second region 22b of the recess 22 is made larger—in particular in the peripheral direction U or in a direction extending at a right angle to the direction of movement B respectively—than the rotor coupling element 20 likewise extending in the peripheral direction U. Similar remarks apply to the first region 22a of the recess 22, which is likewise made larger—as viewed in the peripheral direction U—than the portion of the rotor 7b extending inside the first region 22a of the recess 22, and in particular the diameter of the aforesaid portion.

Consequently a clearance, i.e. a movement in the peripheral direction U, is permitted between the rotor coupling element 20 and the stretch rod coupling element 21, in particular in order to allow a translational movement of the rotor 7b more reliable in the process and consequently also the stretch rod 6 in a manner independent of transverse forces which occur.

Furthermore, the rotor coupling element 20 has a first force absorption side 20a and a first force delivery side 20b, the stretch rod coupling element 21 also having in a corresponding manner a first force absorption side 21a and a first force delivery side 21b.

During the expansion procedure/expanding a thrust force exerted by the rotor 7b to the rotor coupling element 20 is absorbed by the first rotor coupling element force absorption side 20a and is transmitted by way of the first rotor coupling element force delivery side 20b to the first stretch rod coupling element force absorption side 21a and from there to the first stretch rod coupling element force delivery side 21b, from where the thrust force is conveyed further to the stretch rod 6, so that the latter likewise moves in a translational manner in the direction of movement B, and in particular in the direction of the container to be treated, in accordance with the movement of the rotor 7b.

In the case of a release procedure following the expansion procedure, when the pre-form (not shown here) has thus been expanded and the stretch rod 6 is to be moved out of the expanded container again, the rotor 7b exerts—on account of its movement now directed in the opposite direction (namely upwards in the direction of movement B)—a thrust force upon the rotor coupling element 20 and thus the stretch rod coupling element 21 and thus also upon the stretch rod 6, in order also to move the stretch rod 6 upwards for a movement in the direction of movement B.

Accordingly, the thrust force is transmitted from the rotor 7b by way of the first rotor coupling element force absorption side 20a to the first rotor coupling element force delivery side 20b and from there to the first stretch rod coupling element force absorption side 21a as far as the first stretch rod coupling element force delivery side 21b, from where the thrust force is transmitted further to the stretch rod 6. This is possible in particular in the case when a connection preferably with positive locking is present in particular between the first rotor coupling element force delivery side 20b and the first stretch rod coupling element force absorption side 21a.

If the two sides 20b and 21a rest only against each other, however, without being able to engage in each other by corresponding auxiliary elements, the patterns of the lines of force change, in particular during the release procedure and accordingly during the movement of the stretch rod 6 or the rotor 7b respectively back into the starting positions thereof.

As shown in FIG. 2, the design of the recess 22 of the stretch rod coupling element 21 is preferably used so as to be able to shape at least holding elements which extend in sections over the first rotor coupling element force absorption side 20a and which—in the case of the thrust force named above being applied—in turn have or form respectively at least one second stretch rod coupling element force absorption side 24 to which the thrust force is applied.

It is preferable for the rotor coupling element 20 to have no movement clearance in the direction of movement B inside the recess 22, and in particular inside the second region 22b of the recess 22.

Furthermore, it becomes clear in FIG. 2 that the stretch rod coupling element 21, in particular in the region of the first stretch rod coupling element force delivery side 21b, has a stretch rod coupling element bore 21c into which the stretch rod 6, and in particular an end portion of the stretch rod 6, is introduced, in order to be connected to the stretch rod coupling element 21. To this end it is possible for this connection to be effected in a positively locking manner, by for example a mutual engagement of corresponding threads or in the form of a bayonet closure or with the aid of suitable connection media, such as adhesives etc., or even in a friction or non-positively locking manner, by for example a press fitting.

The Applicants reserve the right to claim all the features disclosed in the application documents as being essential to the invention, insofar as they are novel either individually or in combination as compared with the prior art.

LIST OF REFERENCES 1 container treatment device
2 blow moulding device
3 stretching device
4 blow moulding nozzle piston
5 through opening
6 stretch rod
7 stretch rod drive device
7a stator
7b rotor
7c stator bore
8 stretch rod bearing element
9 coupling device
10 valve block device
10a valve block device bore
11 cooling device
12 holding apparatus
13 rotor bearing element
14 blow moulding nozzle piston bearing element
15 covering
20 rotor coupling element
20a first rotor coupling element force absorption side
20b first rotor coupling element force delivery side
21 stretch rod coupling element
21a first stretch rod coupling element force absorption side
21b first stretch rod coupling element force delivery side
21c stretch rod coupling element bore recess
22a first region
22b second region
23 holding projection
24 second stretch rod coupling element force absorption side
B direction of movement
H stroke
L central longitudinal axis
U peripheral direction

The invention claimed is:

1. A container treatment device for expanding pre-forms into containers, having at least one blow moulding device for introducing of a flowable medium under pressure into an inner space of the pre-form, and at least one stretching device for stretching the pre-form during an expansion procedure, wherein the blow moulding device has at least one blow moulding nozzle piston and the stretching device has at least one stretch rod which is movable at least in sections and at least for a time through a through opening of the blow moulding nozzle piston in a translational manner and which is operatively connected to at least one portion of a stretch rod drive device, wherein at least one stretch rod bearing element is arranged in the region of the through opening in order to guide the stretch rod, and wherein a coupling device is arranged between the stretch rod and the stretch rod drive device, wherein the coupling device has at least one rotor coupling element and one stretch rod coupling element, wherein the rotor coupling element has at least one first force absorption side and at least one first force delivery side and the stretch rod coupling element has at least one first force absorption side and at least one first force delivery side, and wherein the rotor coupling element is arranged at least in sections in a recess of the stretch rod coupling element, wherein the recess is made larger at least region by region at least in a peripheral direction which extends at a right angle to the direction of movement of the stretch rod than a periphery of the rotor coupling element which extends at a right angle to the direction of movement of the stretch rod, in order to allow at least a limited movement of the rotor coupling element in the direction which extends at a right angle to the direction of movement of the stretch rod.

2. The apparatus according to claim 1, wherein the stretch rod drive device is a tubular linear motor capable of being driven electrically.

3. The apparatus according to claim 1, wherein a rotor is arranged on the first rotor coupling element force absorption side and the stretch rod is arranged on the first stretch rod coupling element force delivery side.

4. A container treatment device for expanding pre-forms into containers, having at least one blow moulding device for introducing of a flowable medium under pressure into an inner space of the pre-form, and at least one stretching device for stretching the pre-form during an expansion procedure, wherein the blow moulding device has at least one blow moulding nozzle piston and the stretching device has at least one stretch rod which is movable at least in sections and at least for a time through a through opening of the blow moulding nozzle piston in a translational manner and which is operatively connected to at least one portion of a stretch rod drive device, wherein at least one stretch rod bearing element is arranged in the region of the through opening in order to guide the stretch rod, and wherein a coupling device is arranged between the stretch rod and the stretch rod drive device, wherein the coupling device has at least one rotor coupling element and one stretch rod coupling element wherein the rotor coupling element has at least one first force absorption side and at least one first force delivery side and the stretch rod coupling element has at least one first force absorption side and at least one first force delivery side, and wherein the stretch rod coupling element is arranged at least in sections in a recess of the rotor coupling element, wherein the recess is made larger at least region by region at least in a peripheral direction which extends at a right angle to the direction of movement of the stretch rod than a periphery of the stretch rod coupling element which extends at a right angle to the direction of movement of the stretch rod, in order to allow at least a limited movement of the stretch rod coupling element in the direction which extends at a right angle to the direction of movement of the stretch rod.

5. The apparatus according to claim 3, wherein at least one region of the first rotor coupling element force delivery side contacts at least in sections a region of the first stretch rod coupling element force absorption side, in order to transmit the force exerted by the rotor upon the coupling element to the stretch rod at least during the expansion procedure in a positively locking and/or friction locking manner.

6. The apparatus according to claim 1, wherein the rotor has a central longitudinal axis which extends at least in sections in the direction of movement of the stretch rod and which is in alignment at least in sections with a central longitudinal axis of the stretch rod extending at least locally in the direction of movement of the stretch rod.

7. The apparatus according to claim 1, wherein the container treatment device has a holding apparatus which extends at least locally in the direction of the direction of movement of the stretch rod and on which a valve block device guiding and surrounding at least locally the blow moulding nozzle piston and/or a cooling device surrounding at least in part the stretch rod drive device is or are arranged in a stationary manner.

8. A container treatment device for expanding pre-forms into containers, having at least one blow moulding device for introducing of a flowable medium under pressure into an inner space of the pre-form, and at least one stretching device for stretching the pre-form during an expansion procedure, wherein the blow moulding device has at least one blow moulding nozzle piston and the stretching device has at least one stretch rod which is movable at least in sections and at least for a time through a through opening of the blow moulding nozzle piston in a translational manner and which is operatively connected to at least one portion of a stretch rod drive device, wherein at least one stretch rod bearing element is arranged in the region of the through opening in order to guide the stretch rod, wherein a coupling device is arranged between the stretch rod and the stretch rod drive device, wherein the coupling device has at least one rotor coupling element and one stretch rod coupling element, wherein the rotor coupling element has at least one first force absorption side and at least one first force delivery side and the stretch rod coupling element has at least one first force absorption side and at least one first force deliver side wherein a rotor is arranged on the first rotor coupling element force absorption side and the stretch rod is arranged on the first stretch rod coupling element force delivery side, and wherein the rotor coupling element is arranged at least in sections in a recess of the stretch rod coupling element, wherein the recess is made larger at least region by region at least in a peripheral direction which extends at a right angle to the direction of movement of the stretch rod than a periphery of the rotor coupling element which extends at a right angle to the direction of movement of the stretch rod, in order to allow at least a limited movement of the rotor coupling element in the direction which extends at a right angle to the direction of movement of the stretch rod.

9. A container treatment device for expanding pre-forms into containers, having at least one blow moulding device for introducing of a flowable medium under pressure into an inner space of the pre-form, and at least one stretching device for stretching the pre-form during an expansion procedure, wherein the blow moulding device has at least one blow moulding nozzle piston and the stretching device has at least one stretch rod which is movable at least in sections and at least for a time through a through opening of the blow moulding nozzle piston in a translational manner and which is operatively connected to at least one portion of a stretch rod drive device, wherein at least one stretch rod bearing element is arranged in the region of the through opening in order to guide the stretch rod, wherein a coupling device is arranged between the stretch rod and the stretch rod drive device, wherein the coupling device has at least one rotor coupling element and one stretch rod coupling element, wherein the rotor coupling element has at least one first force absorption side and at least one first force delivery side and the stretch rod coupling element has at least one first force absorption side and at least one first force delivery side, wherein a rotor is arranged on the first rotor coupling element force absorption side and the stretch rod is arranged on the first stretch rod coupling element force delivery side, and wherein the stretch rod coupling element is arranged at least in sections in a recess of the rotor coupling element, wherein the recess is made larger at least region by region at least in a peripheral direction which extends at a right angle to the direction of movement of the stretch rod than a periphery of the stretch rod coupling element which extends at a right angle to the direction of movement of the stretch rod, in order to allow at least a limited movement of the stretch rod coupling element in the direction which extends at a right angle to the direction of movement of the stretch rod.

10. The apparatus according to claim 2, wherein the container treatment device has a holding apparatus which extends at least locally in the direction of the direction of movement of the stretch rod and on which a valve block device guiding and surrounding at least locally the blow moulding nozzle piston and/or a cooling device surrounding at least in part the stretch rod drive device is or are arranged in a stationary manner.

11. The apparatus according to claim 4, wherein the container treatment device has a holding apparatus which extends at least locally in the direction of the direction of movement of the stretch rod and on which a valve block device guiding and surrounding at least locally the blow moulding nozzle piston and/or a cooling device surrounding at least in part the stretch rod drive device is or are arranged in a stationary manner.

12. The apparatus according to claim 8, wherein the container treatment device has a holding apparatus which extends at least locally in the direction of the direction of movement of the stretch rod and on which a valve block device guiding and surrounding at least locally the blow moulding nozzle piston and/or a cooling device surrounding at least in part the stretch rod drive device is or are arranged in a stationary manner.

13. The apparatus according to claim 9, wherein the container treatment device has a holding apparatus which extends at least locally in the direction of the direction of movement of the stretch rod and on which a valve block device guiding and surrounding at least locally the blow moulding nozzle piston and/or a cooling device surrounding at least in part the stretch rod drive device is or are arranged in a stationary manner.

\* \* \* \* \*